US012390773B2

(12) United States Patent
Antonio Janz et al.

(10) Patent No.: US 12,390,773 B2
(45) Date of Patent: Aug. 19, 2025

(54) GAS DISPERSION SYSTEM

(71) Applicant: NOV Process & Flow Technologies US, Inc., Houston, TX (US)

(72) Inventors: Eric Edward Antonio Janz, Centerville, OH (US); Kevin J. Myers, Dayton, OH (US)

(73) Assignee: NOV Process & Flow Technologies US, Inc., Houston, TX (US)

( * ) Notice: Subject to any disclaimer, the term of this patent is extended or adjusted under 35 U.S.C. 154(b) by 661 days.

(21) Appl. No.: 16/541,515

(22) Filed: Aug. 15, 2019

(65) Prior Publication Data

US 2021/0046433 A1 Feb. 18, 2021

(51) Int. Cl.

| | |
|---|---|
| ***B01F 23/233*** | (2022.01) |
| ***B01F 27/1123*** | (2022.01) |
| ***F01D 5/04*** | (2006.01) |
| ***F04D 29/22*** | (2006.01) |
| ***F04D 29/66*** | (2006.01) |

(52) U.S. Cl.

CPC ...... *B01F 23/2331* (2022.01); *B01F 27/1123* (2022.01); *F01D 5/045* (2013.01); *F04D 29/2288* (2013.01); *F04D 29/666* (2013.01)

(58) Field of Classification Search

CPC ................ B01F 23/233; B01F 23/2331; B01F 23/23362; B01F 27/071; B01F 27/111; B01F 27/1123; B01F 27/11251; B01F 27/11253; B01F 27/191; F01D 5/045; F04D 29/2288; F04D 29/666

USPC .......................................................... 261/84

See application file for complete search history.

(56) References Cited

U.S. PATENT DOCUMENTS 3,648,989 A 3/1972 Friehe
5,112,192 A * 5/1992 Weetman .............. B01F 27/113 416/201 A
5,198,156 A 3/1993 Middleton et al.
5,316,443 A 5/1994 Smith
5,356,215 A * 10/1994 Inoue .................. B01F 27/0724 366/314
5,358,328 A * 10/1994 Inoue .................... B01F 27/071 366/65
5,791,780 A 8/1998 Bakker (Continued)

FOREIGN PATENT DOCUMENTS

JP H1028853 2/1998
WO WO-2021/030587 A2 2/2021

OTHER PUBLICATIONS

"International Application Serial No. PCT/US2020/046182, International Preliminary Report on Patentability mailed Dec. 23, 2021", 13 pgs.
"International Application Serial No. PCT/US2020/046182, Written Opinion mailed Jul. 8, 2021", 7 pgs.
"International Application Serial No. PCT/US2020/046182, Response to Written Opinion filed Jun. 29, 2021 to Written Opinion mailed Mar. 31, 2021", 6 pgs.

(Continued)

*Primary Examiner* — Marc C Howell
(74) *Attorney, Agent, or Firm* — Schwegman Lundberg & Woessner, P.A.

(57) ABSTRACT

A gas dispersion system may include a drive mechanism, a drive shaft having a proximal end operably coupled to the drive mechanism, extending to a distal end, and configured to transfer rotational motion and torque, a mixing element arranged at or near the distal end of the drive shaft including a hub and multiple blade pairs, each blade pair including an upper blade and a lower blade secured to the hub and cantilevering freely and generally radially away from the hub.

20 Claims, 11 Drawing Sheets

(56) References Cited

U.S. PATENT DOCUMENTS

| | | | | | |
|---|---|---|---|---|---|
| 5,904,423 | A | 5/1999 | Forschner et al. | | |
| 6,082,890 | A * | 7/2000 | Heinzmann | B01F 27/113 | 366/330.4 |
| 7,296,925 | B2 | 11/2007 | Himmelsbach et al. | | |
| 8,277,114 | B2 | 10/2012 | Higbee et al. | | |
| 2009/0231952 | A1* | 9/2009 | Higbee | B01F 27/0722 | 416/197 R |
| 2010/0124147 | A1* | 5/2010 | Janz | B01F 27/071 | 366/343 |
| 2010/0149903 | A1* | 6/2010 | Imai | B01F 27/0723 | 366/77 |
| 2011/0207218 | A1* | 8/2011 | Staheli | C12N 1/14 | 435/296.1 |
| 2015/0165397 | A1* | 6/2015 | Higbee | B01F 27/113 | 29/889.7 |
| 2015/0240832 | A1* | 8/2015 | Xia | B01F 27/1134 | 416/243 |
| 2018/0117544 | A1* | 5/2018 | Zheng | B01F 27/1152 | |

OTHER PUBLICATIONS

"International Application Serial No. PCT/US2020/046182, Response to Written Opinion filed Sep. 7, 2021 to Written Opinion mailed Jul. 8, 2021", 7 pgs.

"International Application Serial No. PCT/US2020/046182, International Search Report mailed Mar. 31, 2021", 9 pgs.

"International Application Serial No. PCT/US2020/046182, Invitation to Pay Additional Fees mailed Feb. 1, 2021", 13 pgs.

"International Application Serial No. PCT/US2020/046182, Written Opinion mailed Mar. 31, 2021", 11 pgs.

"European Application Serial No. 20761970.1, Response to Communication pursuant to Rules 161(1) and 162 EPC filed Sep. 30, 2022", 25 pgs.

"European Application Serial No. 20761970.1, Communication Pursuant to Article 94(3) EPC mailed Oct. 31, 2023", 4 pgs.

"European Application Serial No. 20761970.1, Response filed Feb. 16, 2024 to Communication Pursuant to Article 94(3) EPC mailed Oct. 31, 2023", 23 pgs.

* cited by examiner

GAS DISPERSION SYSTEM

TECHNICAL FIELD

The present disclosure relates to fluid agitation. More particularly, the present disclosure relates to devices and methods for agitating liquids. Still more particularly, the present disclosure relates to devices and methods for gas dispersion within a liquid. Still more particularly, the present disclosure relates to a particular impeller geometry for gas dispersion in a liquid.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Gas dispersion may involve introducing gas into a liquid below an impeller and relying on the impeller to disperse the gas into the liquid as the gas rises to the level of the impeller. For purposes of discussion, the impeller may be assumed to be arranged in a substantially horizontal rotation plane above a gas entry point and the impeller's driving shaft may be assumed to be arranged along a vertical axis. In contrast to axial flow impellers, the goal of the gas dispersion impeller may be to disperse the incoming gas rather than merely pump it in an axial direction. Accordingly, and historically, a disc-type impeller was often used to control the flow of gas and arrest its upward motion. The disc-type impeller included perpendicularly arranged plate-shaped blades for forcing the gas in a radial direction with the goal of dispersing it within the liquid. Later developments substituted semi-circular cup-shaped blades for forcing the gas in a radial direction. Still later developments substituted parabolic cup-shaped blades for forcing the gas in a radial direction.

The presently known systems for gas dispersion require relatively sophisticated fabrication techniques to create the semi-circular and/or parabolic cups and to attach those cups to a circular plate. Moreover, once fabricated, the angle of attack of the upper and lower portions of the cups relative to one another are defined and variations from that relationship are generally not available.

SUMMARY

In one or more embodiments, a gas dispersion system may be provided. The gas dispersion system may include a drive shaft having a proximal end operably coupled to the drive mechanism, extending to a distal end, and configured to transfer rotational motion and torque. The gas dispersion system may also include a mixing element arranged at or near the distal end of the drive shaft. The mixing element may include a hub and a plurality of blade pairs. The blade pairs may include an upper blade and a lower blade secured to the hub and the blades may cantilever freely and generally radially away from the hub.

In one or more embodiments, a mixing element for gas dispersion operations may be provided. The mixing element may include a hub and a plurality of blade pairs. The blade pairs may include an upper blade and a lower blade secured to the hub and the blades may cantilever freely and generally radially away from the hub.

In one or more embodiments including the above described system or the above described mixing element, several additional features may be provided. For example, the upper blade and the lower blade of the plurality of blade pairs may extend along substantially parallel lines. In another example, the upper blade and the lower blade of each of the plurality of blade pairs may be arranged at substantially the same circumferential position on the hub. In still another example, each blade of the plurality of blade pairs may have a leading edge and a trailing edge and the distance between the leading edges of the blades of a pair of blades may be greater than the distance between the trailing edges of the blades of a pair of blades. The blades may also have a stiffness sufficient to avoid deflective contact during dispersing operations. The blades may have a decreased angle of attack at the leading edge as compared to the trailing edge. The blades may also include a blade pitch and the amount of pitch may be established by a blade stub arranged on the hub. The pitch of the blades may be equal and opposite between the upper blade and the lower blade and may range from +45 degrees to −45 degrees or from +30 degrees to −30 degrees. The blade shape of the upper blade may be a mirror image of the lower blade. In one or more embodiments, the blades may be tapered so as to have a first width at an outer edge and a second narrower width at an inner edge. In addition, the leading edge may have an arcuate shape and the outer edge may also have an arcuate shape. In one or more embodiments, the blades may extend substantially radially away from the hub or, alternatively, may extend radially away and in a swept back fashion. In one or more embodiments, the system may include a tank configured for arrangement of the mixing element therein and may also include a gas supply for introducing gas into the tank.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present application, in one or more embodiments, relates to a particular design of a gas dispersion impeller. The impeller may include a hub with substantially radially extending blade pairs. The blade pairs may include upper and lower blades that are attached to the huh that extend relatively or substantially parallel to one another away from the hub and may avoid connection or contact with each other. In one or more embodiments, the blade pairs may mimic the arrangement or shape of a cupped or parabolic gas dispersion blade, but individually, the blades may be more akin to blades of axial flow impellers. The design of the disclosed impellers may reflect a significant simplification in design and may provide for more flexibility in design due to not being tied to a particular cupped or parabolic shape. That is, the separate blades may be arranged relative to one another to create a wider array of blade pair shapes while using a single blade design.

Figure 1:
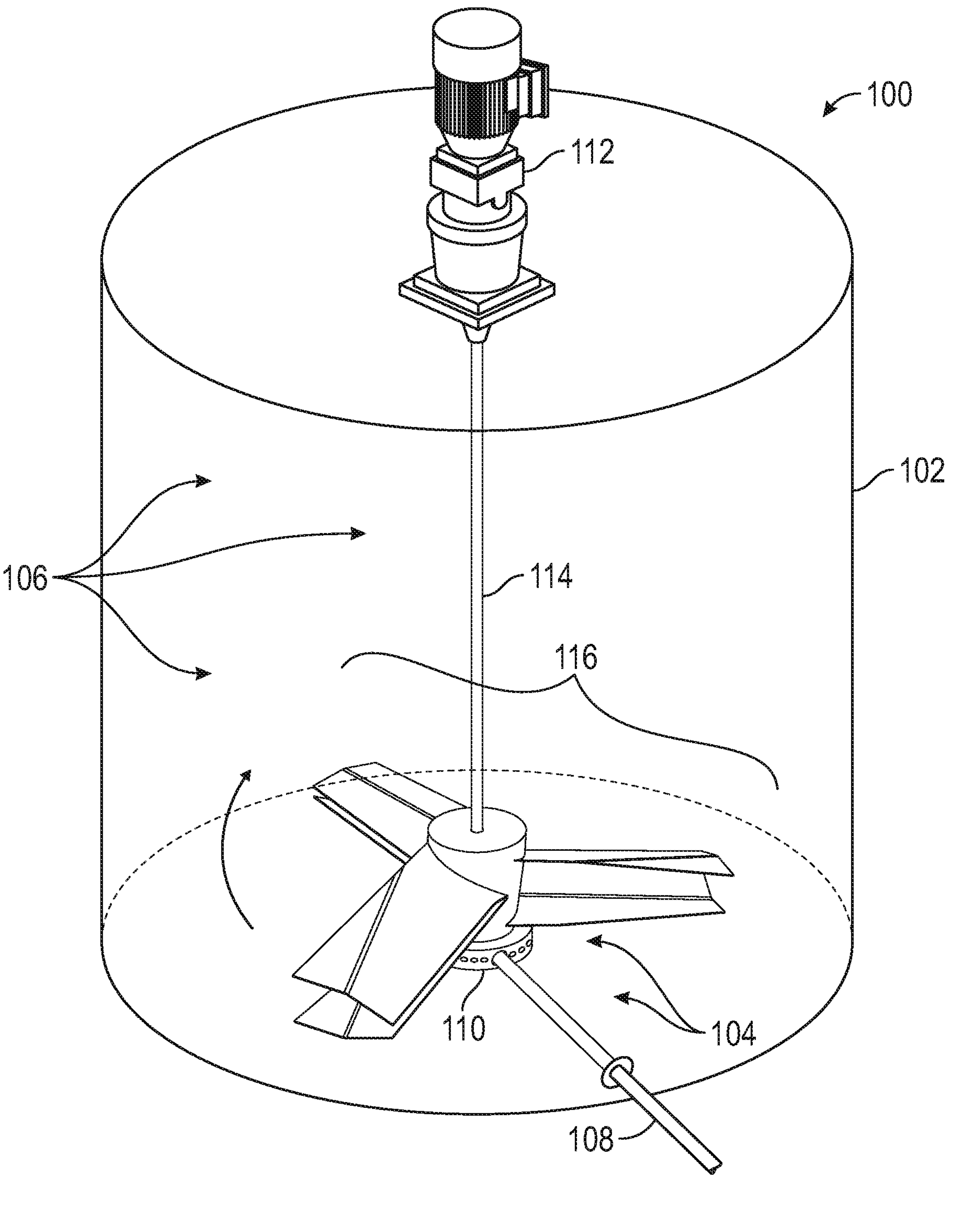
FIG. 1 is a perspective view of a gas dispersion tank having a gas dispersion impeller arranged therein, according to one or more embodiments.

FIG. 1 shows a gas dispersion system 100 including, for example, a fermentation tank, aerobic digestion tank, chemical production tank, or other process tank 102 calling for or utilizing gas dispersion techniques. The system may be configured for containing a fluid such as a liquid or slurry, bubbling or otherwise introducing a gas into the liquid or slurry, and dispersing the gas within the liquid or slurry using a gas dispersion impeller. The system may include a tank or container 102, a gas supply system 104, and a mixing or dispersing system 106.

As shown in FIG. 1, the tank or container 102 may be configured for containing a liquid or slurry. The tank or container 102 may include an inlet (not shown) and an outlet (not shown) for allowing fluid to enter and exit the container 102. Valves may be provided on the inlet and/or the outlet to control the amount and/or amount of time the liquid or slurry spends in the tank or container 102.

A gas supply system 104 may be provided for introducing gas into the tank 102 and into the fluid within the tank or container 102. The gas supply system 104 may include a pressurized gas source (not shown) such as a compressed gas tank or cylinder and/or a compressor or blower, for example. The gas supply 104 may also include a feed line 108 for conveying the gas from the source to a location within the tank 102. The feed line 108 may extend to a bubbler, diffuser, or other gas introduction or addition mechanism 110 within the tank 102. In one or more embodiments, the gas introduction mechanism 110 may be arranged at or near the bottom of the tank 102 so as to introduce the gas below the gas dispersion system 106. Alternatively or additionally, the gas introduction mechanism 110 may be arranged at another position in the tank 102 and multiple gas introduction mechanisms 110 may be provided. In one or more embodiments, the gas introduction mechanism 110 may include a tubular member having gas introduction orifices in a surface thereof. In one or more embodiments, the tubular member may be annularly shaped or another shape may be provided. Alternatively or additionally, the gas introduction mechanism 110 may include a pressurized plenum or space having a perforated plate arranged on a top side thereof. A selected pattern of perforations may be provided in the plenum to introduce gas in a desired pattern, for example. In one or more embodiments, the pressure in the gas introduction mechanism 110 may exceed that of the fluid in the tank or container 102 to avoid flow of fluid into the gas introduction mechanism 110.

The mixing or dispersing system 106 may be arranged on and/or in the tank or container 102 and may be configured for dispersing the gas introduced by the gas supply system 104. The mixing or dispersing system 106 may include a drive portion 112, a drive shaft 114, and a mixing element 116.

The drive portion 112 may include a motor such as an electric motor, a gas powered motor, or another motor for providing rotational power. In one or more embodiments, a direct drive motor, an offset drive motor, a gear reducing motor, a belt driven motor, or other motors may be provided. The drive portion 112 may be connected to a drive shaft 114 and may operate to rotate the drive shaft 114 at relatively high angular velocities. The drive shaft 114 may extend from the drive portion 112 to a distal end where an impeller or other mixing element 116 may be secured or mounted. The drive shaft 114 may include a cylindrical rod, rectangular rod, a tube, or other relatively stiff and torsionally resistive element such that rotation and torque from the drive portion 112 may be transferred to the mixing element 116. The drive shaft 114 may have a length selected to suitably position the mixing element 116 in the tank or container 102 and at a distance from the drive portion 112.

The mixing element 116 may be arranged on the drive shaft 114 and may be secured to the drive shaft 114 so as to rotate with the drive shaft 114. The mixing element 116 may be configured for rotating within a liquid to stir or mix the liquid in a container or tank 102. More particularly, the mixing element 116 may be configured to disperse gas within a liquid.

Figure 2:
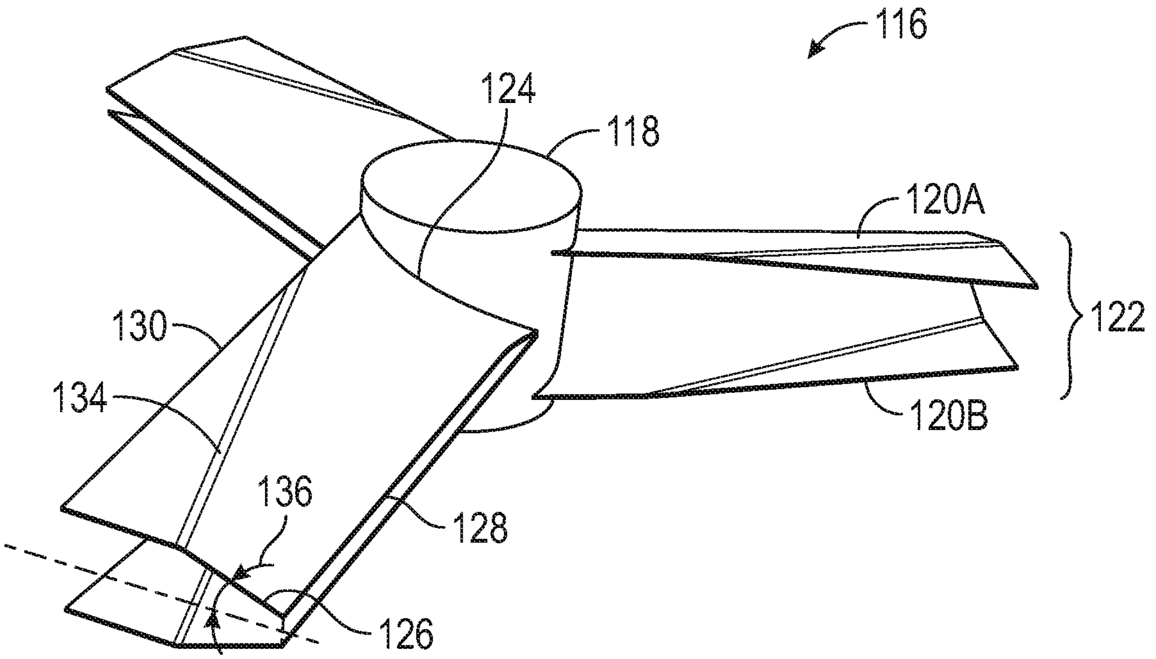
FIG. 2 is a perspective view of the gas dispersion impeller of FIG. 1.
Figure 3:
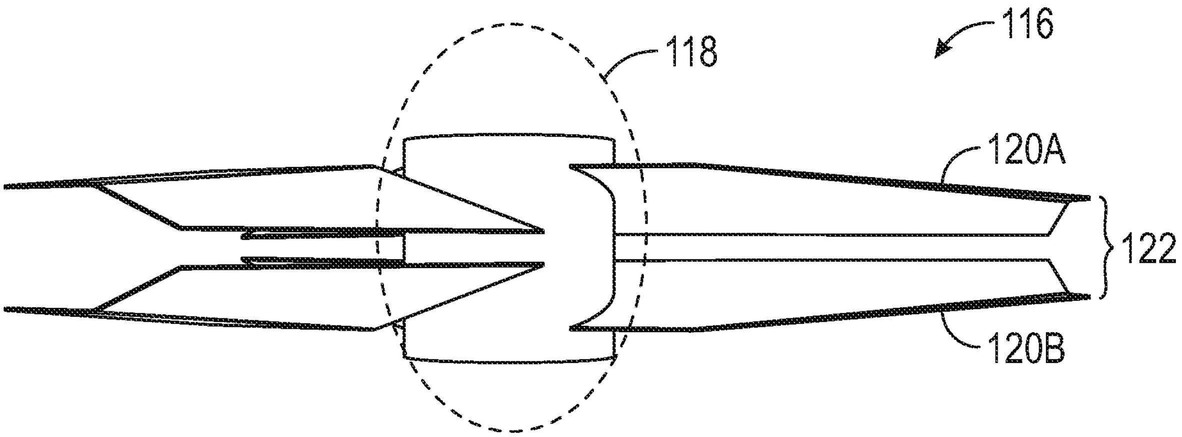
FIG. 3 is a side view thereof.
Figure 4:
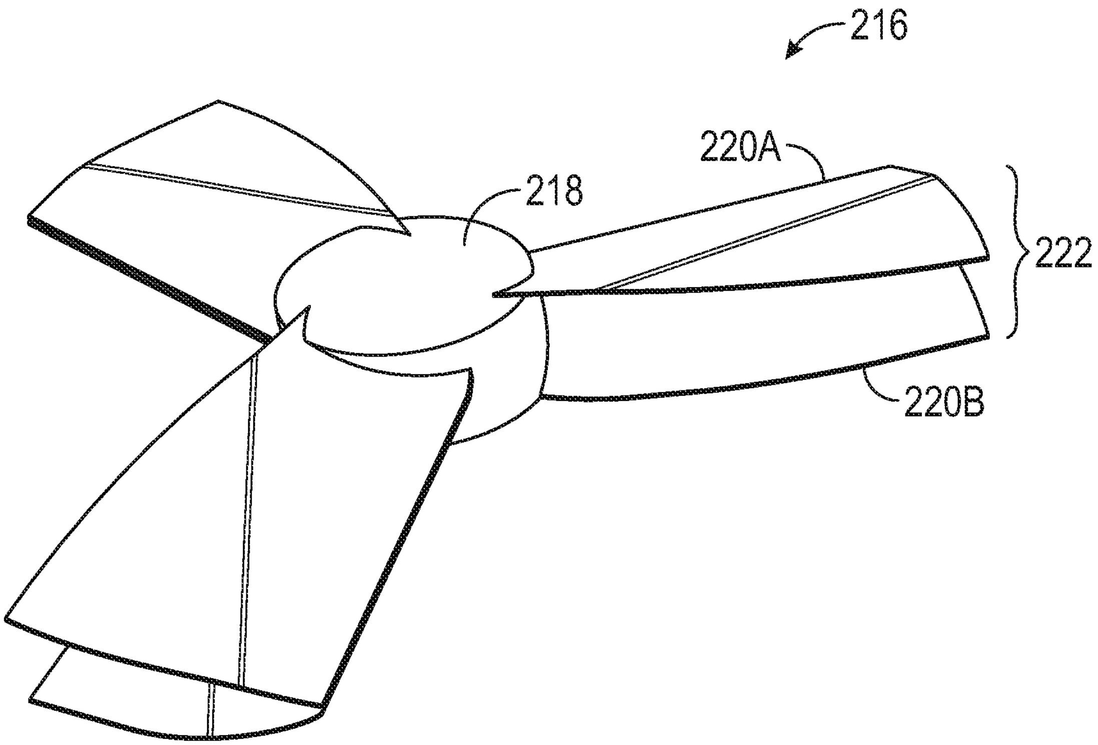
FIG. 4 is a perspective view of a gas dispersion impeller with a relatively narrow blade profile, according to one or more embodiments.
Figure 5:
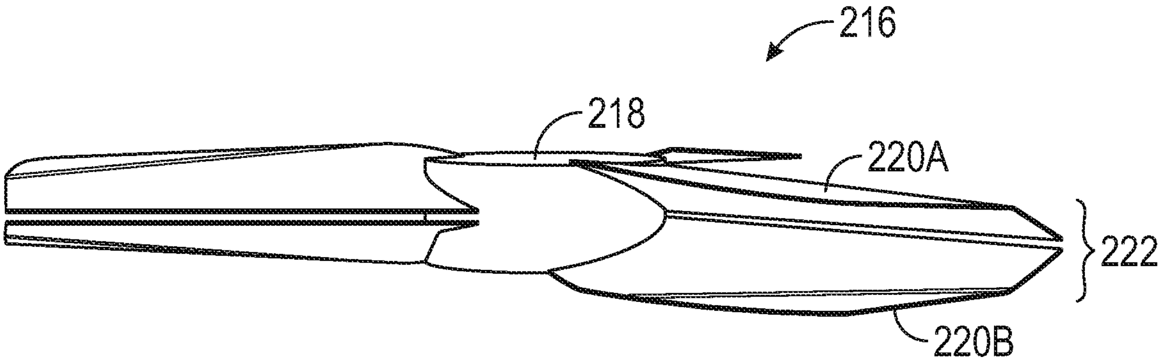
FIG. 5 is a side view thereof.
Figure 6:
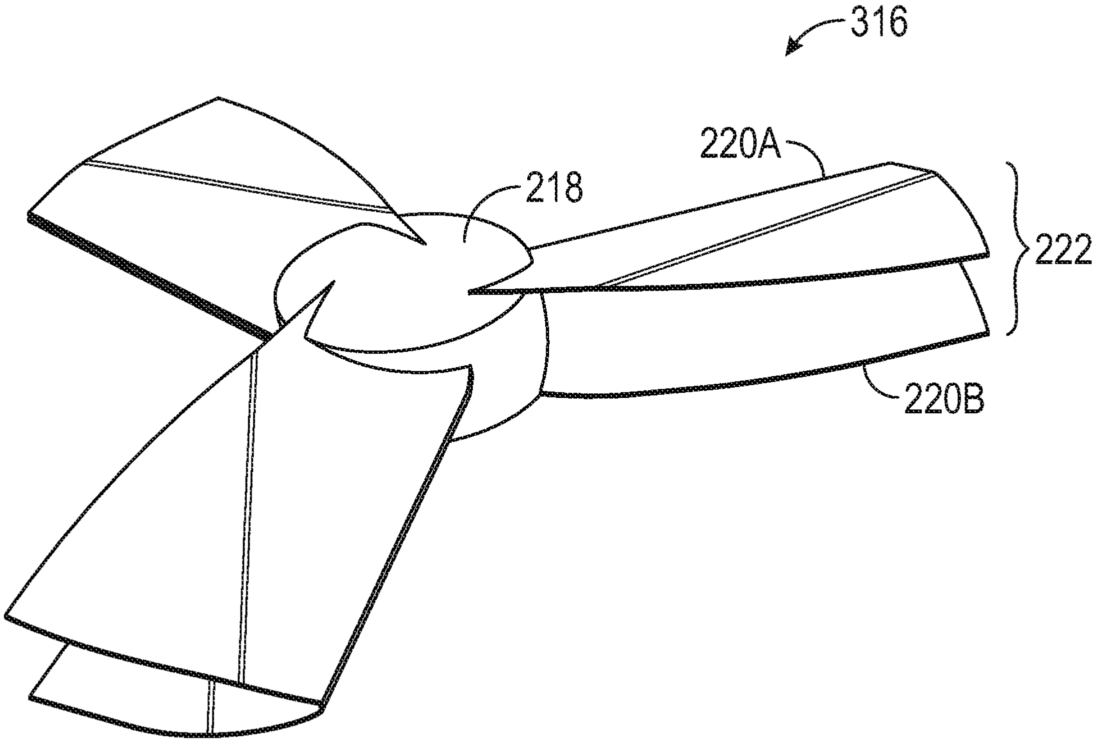
FIG. 6 is a perspective view of a gas dispersion impeller with a wider blade profile than the impeller of FIGS. 4 and 5, according to one or more embodiments.
Figure 7:
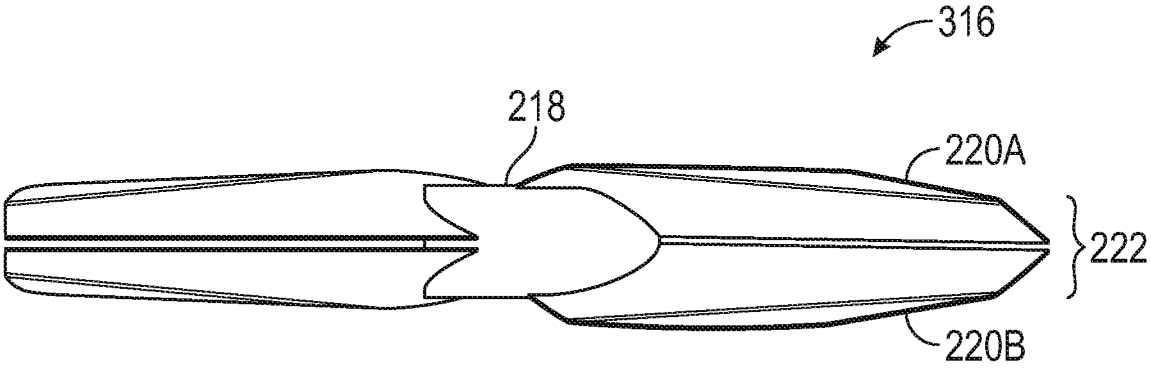
FIG. 7 is a side view thereof.

As show in FIGS. 2 and 3, the mixing element 116 may include a hub 118 and a plurality of blades 120 or blade pairs 122. Generally, the hub 118 may be configured for mounting to the drive shaft 114. In one or more embodiments, the hub 118 and drive shaft 114 may have a keyed connection allowing the hub 118 to be slipped onto an end of the drive shaft 114 and engaging a key or notch, which may prevent relative rotation of the two elements. The position of the hub 118 along the drive shaft 114 may be secured using a stop above the hub 118 or on the drive portion side of the hub 118 and another stop below or opposite the drive portion side of the hub 118. In one or more embodiments, a hub 118 may be welded or otherwise fused to the drive shaft 114. Still other connection approaches may be used for securing the hub 118 to the drive shaft 114. Additional detail about the hub 118 and the attachment of the hub 118 to the blades is discussed with respect to FIGS. 18-20 below.

The plurality of blades 120 or blade pairs 122 may be arranged on the hub 118 and may extend radially away from the hub 118. The blades 120 or blade pairs 122 may be configured to interact with the liquid or slurry in a mixing fashion and, in particular, to create flow within the liquid or slurry. The blades 120 may include an inner end 124 and an outer end 126. The blades 120 may be secured to the hub 118 at their inner end 124 and may extend radially outward to an outer end 126. In one or more embodiments as shown in FIGS. 2 and 3, the blades 120 may have a relatively rectangular shape when viewed from above and may include substantially straight edges 128, 130 extending radially away from the hub 118 and a substantially straight outer end 126 when viewed from above. The blades 120 may each include a leading edge 130 and a trailing edge 128 and a plate-like surface extending between the several edges/ends. In one or more embodiments, the plate-like surface may include a crease or bend 134 beginning at the leading edge 130 near an inner end 124 thereof and extending diagonally across the blade to an outer end 126 near a mid-length of the outer end 126. As discussed in more detail below, the blades 120 may be pitched at an angle and the crease or bend 134 may cause a leading portion of the blade 120 to be arranged relatively horizontally or relatively parallel to the rotation plane. That is, the plate-like blade may be bent at the crease or bend 134 an amount sufficient to counteract the pitch of the blade 120 and, thus, flatten out the portion of the blade 120 that is on the leading side of the crease or bend 134. As may be apparent from a review of FIGS. 2 and 3 or other embodiments herein, the blades 120 may be secured to the hub 118 without the presence of a central circular plate. That is, the blades 120 may be secured to the hub 118 directly or with isolated or spaced apart stubs and a continuous or substantially continuous plate may be omitted.

The above-described crease or bend may create a reduced angle of attack at the leading edge as compared to the trailing edge. A crease or relatively focused bend may be one approach to decreasing the angle of attack at the leading edge. However, other approaches may include a more arcuate blade shape where the bend is less focused and extends over a larger portion of the blade surface. Still other approaches may be used where the crease, focused bend, or more broadly spread bend or arc is positioned closer to or further from the leading edge such that the transition between a decreased angle of attack and a sharper angle attack is closer to the leading edge or further from the leading edge. Still other approaches may include an increased angle of attack at the leading edge instead of a reduced angle of attack.

Figure 23:
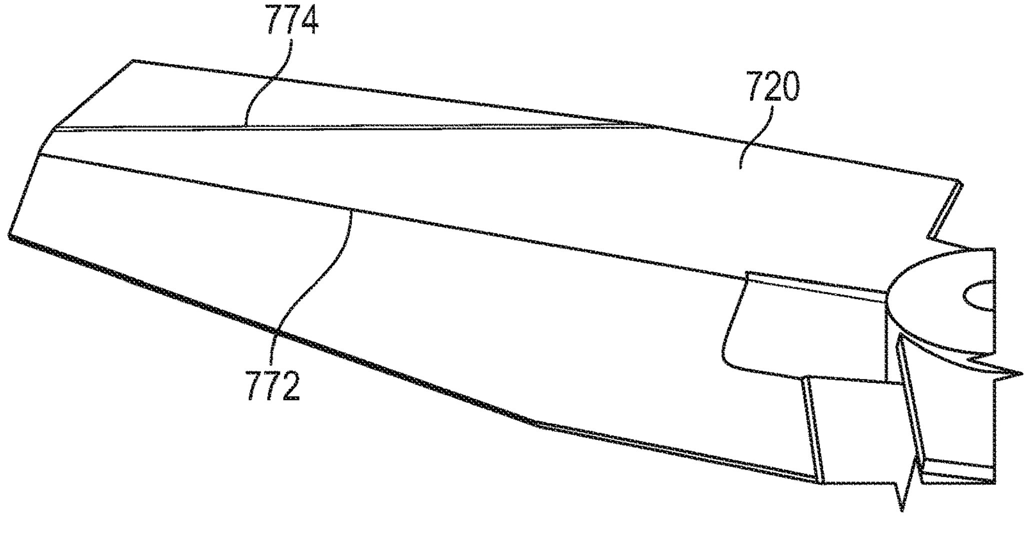
FIG. 23 is a perspective view of a blade of the impeller, according to one or more embodiments.

While a particular blade shape has been described, several blade shapes may be used. For example, in one or more embodiments, a blade 720 may be provided having a substantially rectilinear crease 772 extending along a longitudinal length thereof. That is, as shown in FIG. 23, a blade 720 may have a generally centralized crease 772 or bend extending from the hub attachment location and generally bisecting or substantially bisecting the blade into a leading half and a trailing half. The blade may also have an additional crease 774 similar to the blade shown in FIGS. 8-10, but limited to a region on the leading half or trailing half. In one or more embodiments, the blade may be the same or similar to the blade shaped shown and described in U.S. Pat. No. 8,220,986, entitled High Efficiency Mixer-Impeller, and filed on Nov. 19, 2008, the content of which is hereby incorporated by reference herein in its entirety. As described therein, the blade may include a first crease 772 that may be generally linear and extend longitudinally from a root to a tip of the blade. The crease 772 may be centrally located along a mid-width of the blade. The crease may divide the blade into a leading portion and a trailing portion. The leading portion may include a leading edge. As shown, leading edge may be beveled at approximately a 45° angle with respect to the plane of the leading portion.

The leading portion may include a second bend or crease 774 that may be generally linear and extend from a point along the leading edge between the root and tip to a point on the tip that is spaced from the point at which the first crease intersects the tip. The crease may form a bend line for the tip portion, which may be a part of the leading portion and may be generally flat.

Thus, as shown, the leading portion may be substantially flat and may include a tip portion which itself is substantially flat and angled relative to the remainder of the leading portion. As shown, the leading portion may form a camber with the trailing portion at an angle that may be approximately 155°. The tip portion may be angled at an angle of approximately 165° relative to the trailing portion. Put another way, the tip portion may form an angle along a second crease of approximately 13.5 degrees with the remainder of the leading portion.

The plurality of blades 120 and blade pairs 122 may be generally arranged in a rotational plane, or planes, that is substantially perpendicular to the drive shaft 114. In one or more embodiments, the blades 120 of a given pair may include mirror images of one another. The blades 120 of each pair 122 may be secured to the hub 118 at their respective inner ends 124 and both blades 120 may extend radially from the hub 118 generally parallel to one another establishing a plane of rotation passing between the blades 120. The blades 120 may cantilever freely from the hub 118 in a radial direction and, as such, may not be connected to the other blade 120 of the blade pair 122.

The blades 120 of each pair 122 may have a blade pitch defined by the blades angular orientation 136 relative to the plane of rotation. The blade pitch may be selected giving consideration to a desired power number, a desired gassed power number, a desired mass transfer rate, and/or other factors. In one or more embodiments, the blade pitch may range from approximately 45 degrees to approximately −45 degrees. In other embodiments, the blade pitch may range from approximately 20 degrees to approximately −20 degrees. In still other embodiments, the blade pitch may range from approximately 10 degrees to approximately −10 degrees. It is to be appreciated that while an equal and opposite blade pitch may be provided for the upper and lower blades, other combinations may be provided where the blade pitch may be opposite, but not equal, for example. In one or more embodiments, an upper blade may have a blade pitch of 20 degrees and a lower blade may have a blade pitch of −10 degrees. Still other ranges of blade pitch may be provided within and/or outside the ranges mentioned and with varying blade pitches on the top or bottom. Most any particular combination of blade pitches may be selected based on the performance desired.

Figure 21:
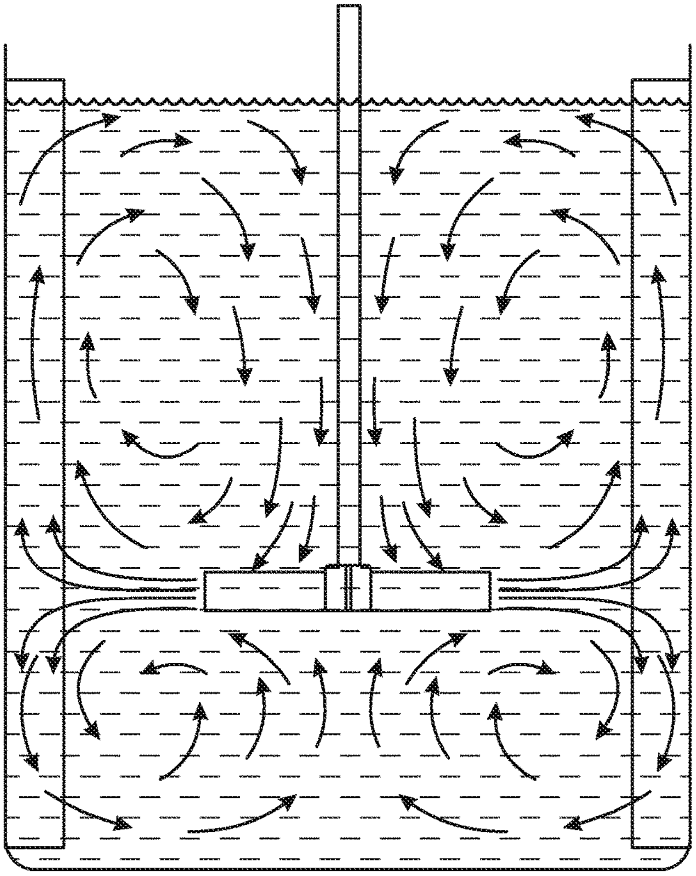
FIG. 21 is a diagram of radial fluid flow produced by a mixing element, according to one or more embodiments.

When measured as shown in FIG. 2, the blade pitch of the upper blade 120A may be a positive angle, meaning the angle is above the rotation plane. The blade pitch of the lower blade 120B may be a negative angle, meaning the angle is below the rotation plane. Moreover, the direction of rotation of the mixing element 116 may be clockwise when viewed from above and, as such, the leading edges 130 of the upper and lower blades 120 may form an open mouth or relatively large area and the trailing edges 128 may be narrower forming a reduced area at the trailing edge 128. The described geometry may have a tendency to collect fluid as the mixing element 116 spins and opposing flows are created by the upper and lower blades, causing the collection of fluid between the blades 120 near the trailing edge 128. As the blades 120 rotate, this collection of fluid near the trailing edge 128 may cause fluid that is unable to pass between the blades to be discharged or propelled radially as shown, for example in FIG. 21. However, due to the gap in the blades 120 at the trailing edge 128, some fluid may be allowed to pass between the blades 120. The interaction of the blades 120 may be very effective to disperse gas encountering the rotating blades 120 and may be further effective to reduce the power number as compared to known geometries for gas dispersion. Notably, and while each individual blade 120 may have similarities to longitudinal flow blades, the described geometry may not have a tendency to create axial flow in the direction of the drive shaft 114.

FIGS. 4-7 show mixing elements 216, 316 similar to that of FIGS. 2-3, but having a slightly different blade shape and depicting two degrees of blade pitch. For example, a review of FIGS. 4 and 5 in comparison to FIGS. 6 and 7 helps to show the difference between a mixing element 216 with a relatively shallow blade pitch (i.e., FIGS. 4 and 5) compared to a mixing element 316 with a higher or steeper blade pitch (i.e., FIGS. 6 and 7).

Figure 8:
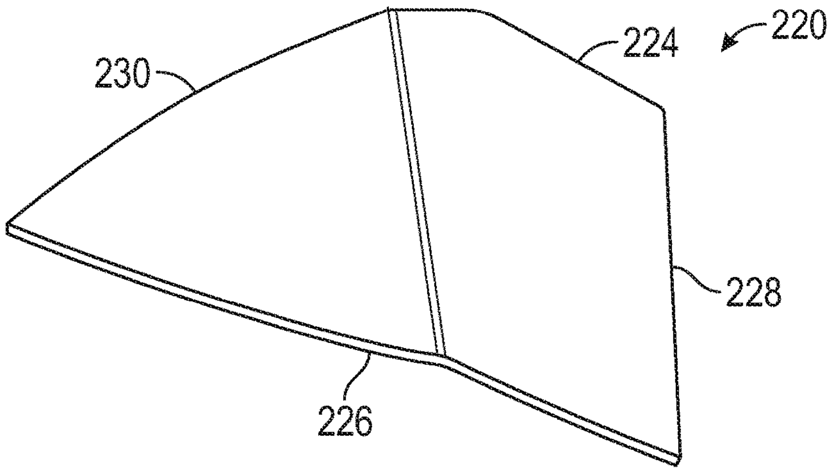
FIG. 8 is a perspective view of the blade of the impellers of FIGS. 4-7.
Figure 9:
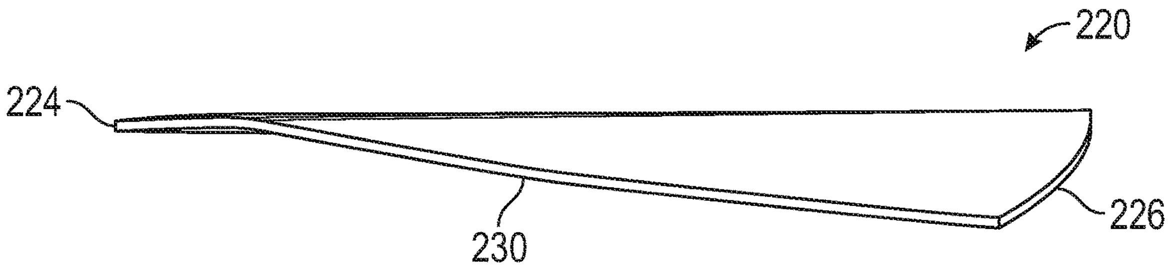
FIG. 9 is a side view thereof.
Figure 10:
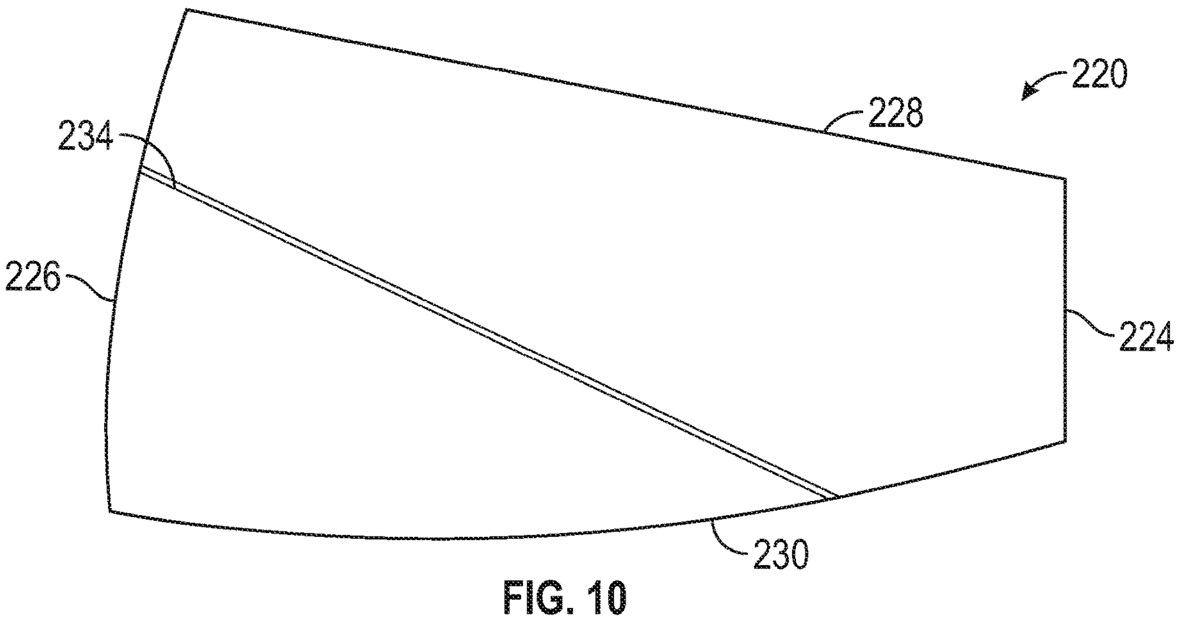
FIG. 10 is a bottom view thereof.
Figure 11:
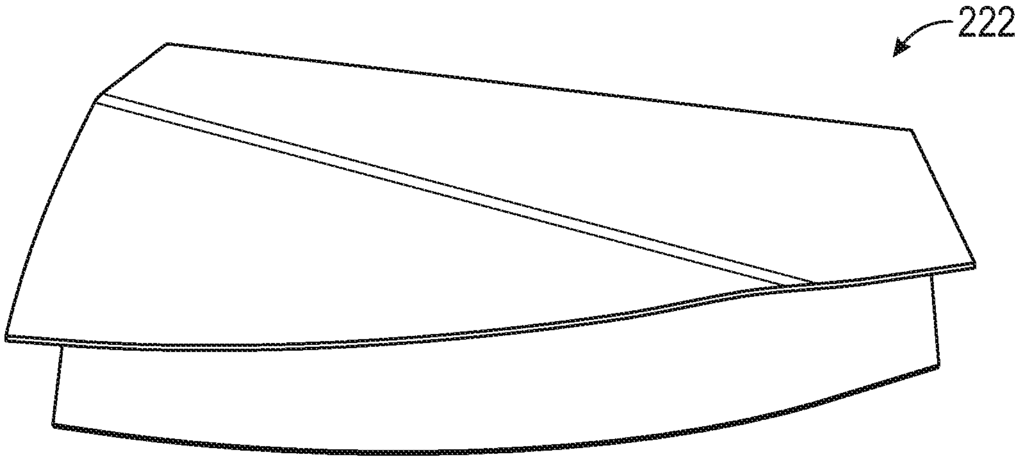
FIG. 11 is a top perspective view of a blade pair, according to one or more embodiments.
Figure 12:
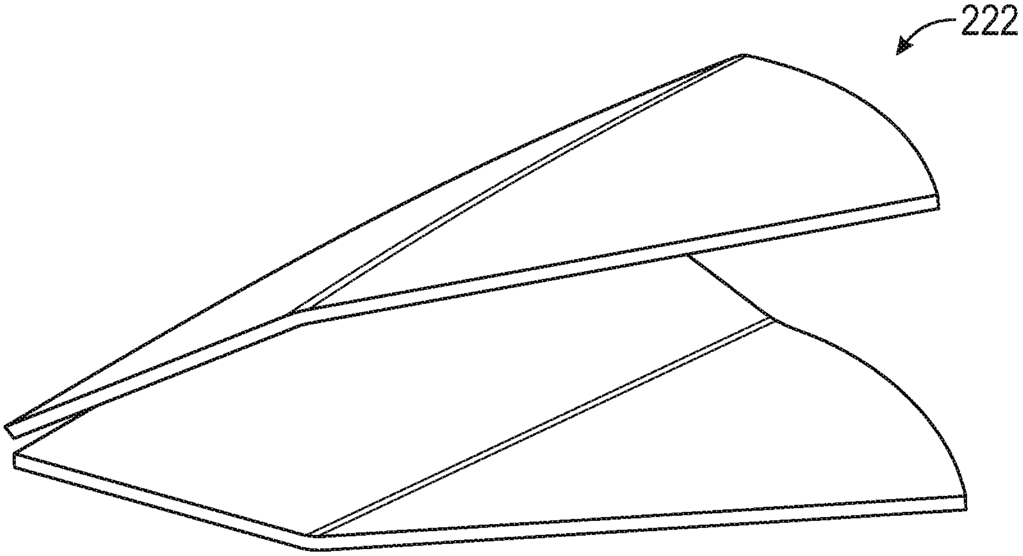
FIG. 12 is an end view thereof.
Figure 13:
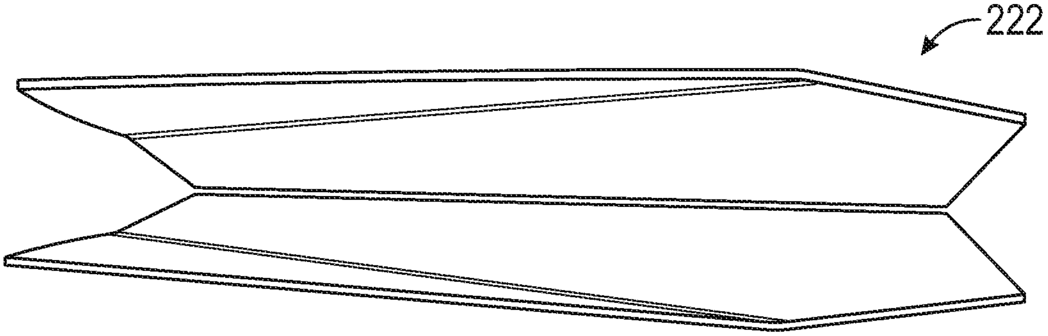
FIG. 13 is a side view thereof.

In contrast to the substantially rectangular blade shape shown in FIGS. 2 and 3, the blade shape of FIGS. 4-7 may be tapered and curved. Particular views of the blades 220 of the mixing elements of FIGS. 4-7 are shown in FIGS. 8-10. As shown, and with reference to FIG. 10, the blades 220 may be slightly narrower at the inner end 224 near the hub and slightly wider near the outer end 226 of the blade 220 causing them to be tapered. Moreover, the outer end 226 of the blade 220 may have an arcuate shape 226 when viewed from above rather than being substantially straight. Still further, the leading edge 230 of the blade may also have an arcuate shape. Like the blades of FIGS. 2-3, the blades shown in FIGS. 8-10 may include a crease or bend 234 beginning at the leading edge 230 near an inner end 224 thereof and extending substantially diagonally across the surface of the blade 220 to an outer end 226 at or near a mid-length thereof. In one or more embodiments, the diagonal crease or bend 234 may reach the outer end 226 near the ⅔ point or the ¾ point along the outer end 226 when measuring from the leading edge 230 to the trailing edge 228. FIGS. 11-13 depict the blades 220 of FIGS. 8-10 arranged in pairs 222. As discussed in detail above, still other approaches to reducing or increasing the angle of attack at the leading edge may also be provided and may be used with the blade shapes described here or elsewhere in the application.

Figure 14:
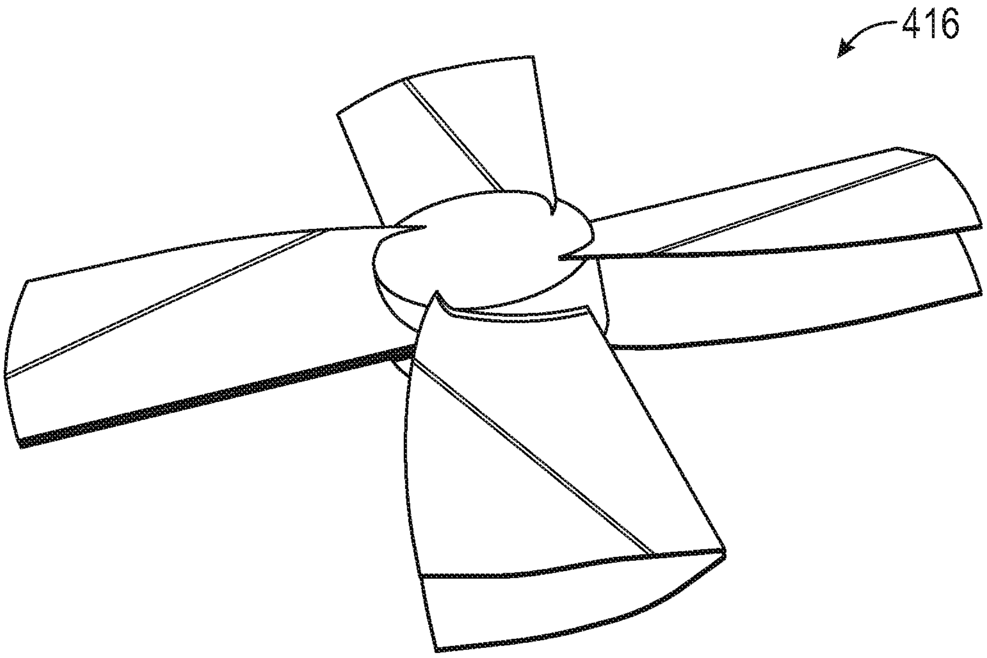
FIG. 14 is a perspective view of a gas dispersion impeller with four blade pairs, according to one or more embodiments.
Figure 15:
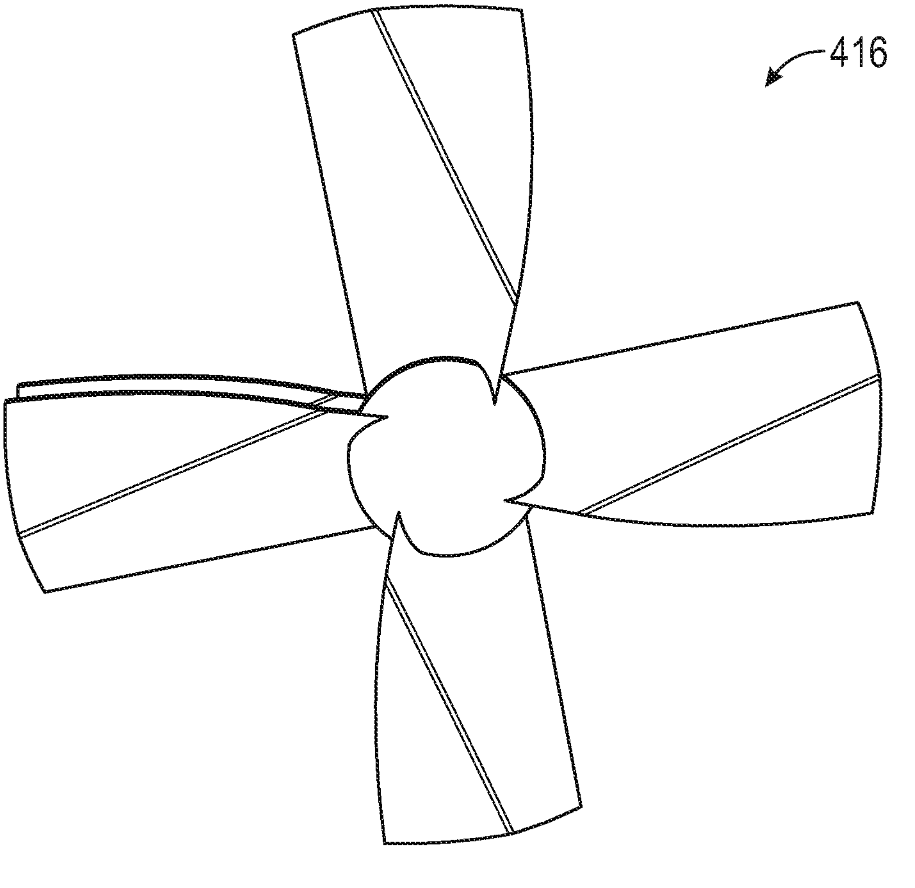
FIG. 15 is a top view thereof.
Figure 16:
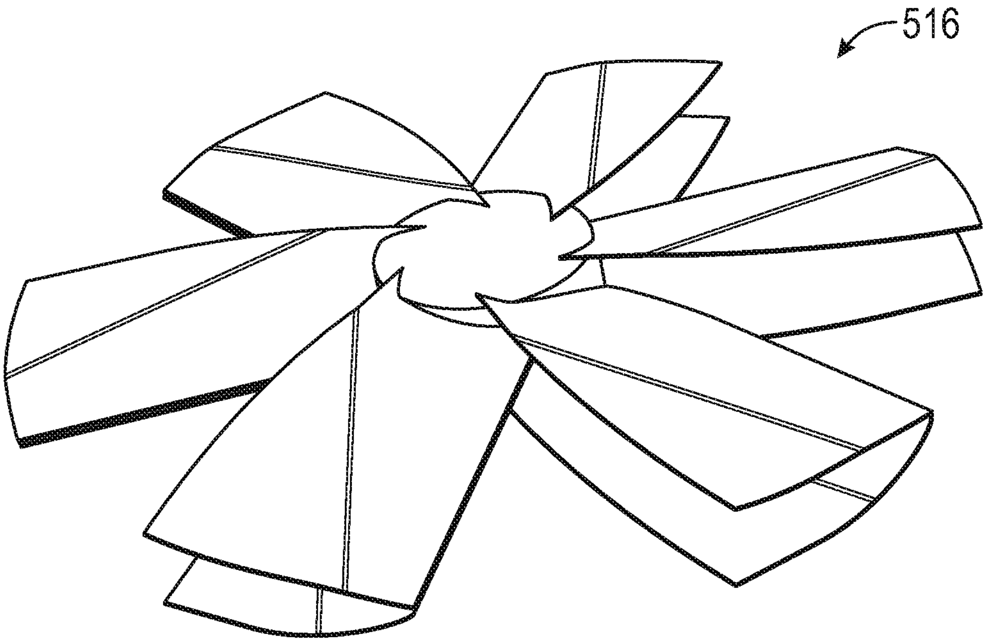
FIG. 16 is a perspective view of a gas dispersion impeller with six blade pairs, according to one or more embodiments.
Figure 17:
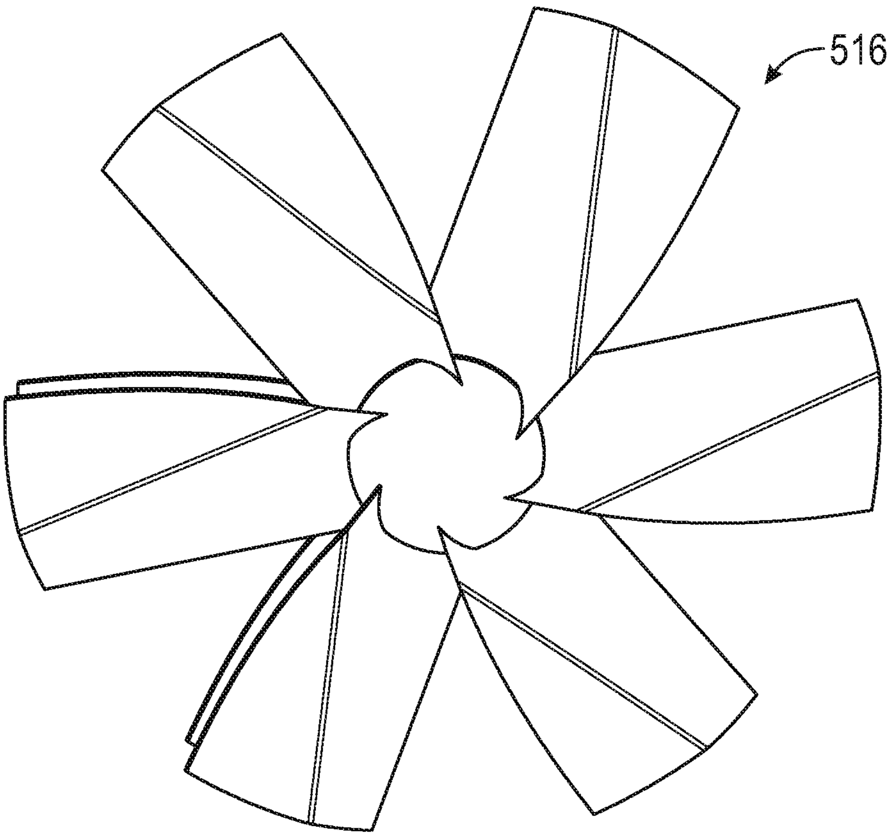
FIG. 17 is a top view thereof.

Other than the differences mentioned, the mixing elements 216, 316 of FIGS. 4-7 may be the same or similar to the mixing elements 116 described with respect to FIGS. 2-3. For example, the blades 220 may be secured to the hub 218 at their inner end 224 and may extend radially outward to an outer end 226. The mixing elements 116, 216, 316 of FIGS. 1-7 each show the plurality of blade pairs 122, 222 including three blade pairs. Other numbers of blade pairs 122, 222 may be used including 2 blade pairs, 4 blade pairs, 5 blade pairs, 6 blade pairs, and other numbers of blade pairs. FIGS. 14-15 depict a mixing element 416 having 4 blade pairs and FIGS. 16-17 depict a mixing element 516 having 6 blade pairs.

Figure 22:
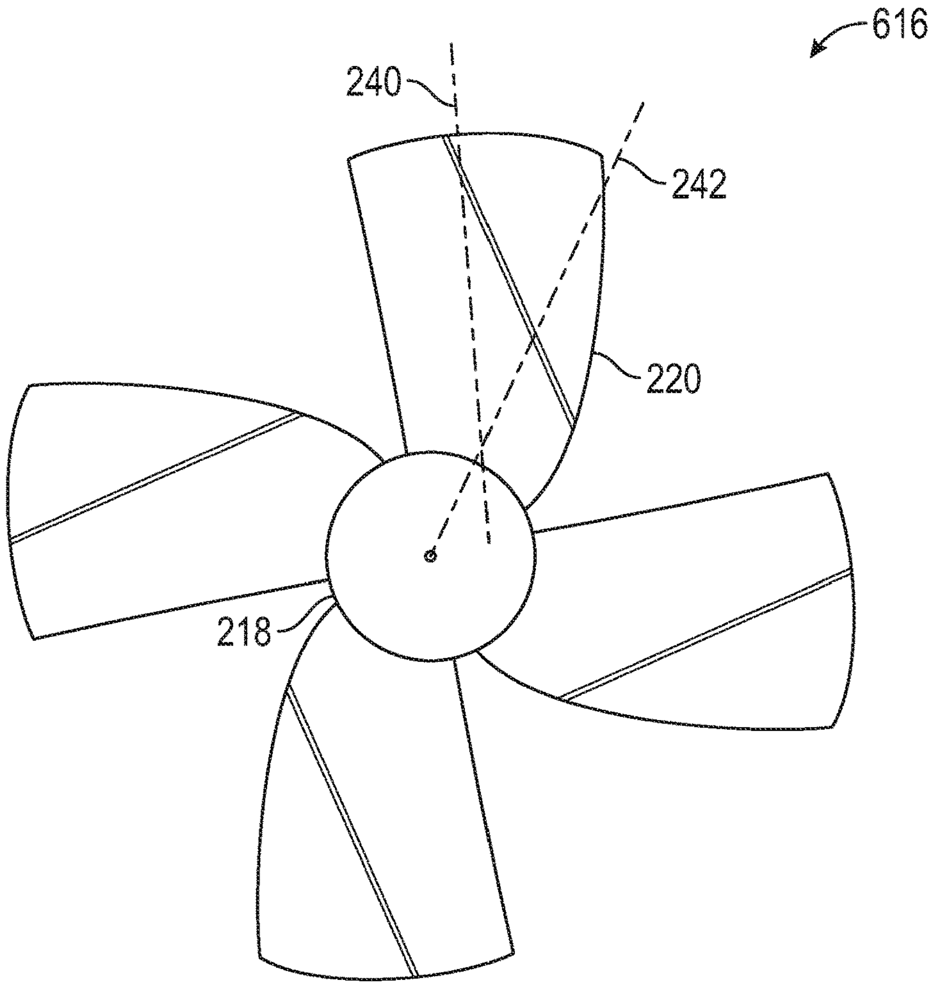
FIG. 22 is a diagram of a blade pattern where blades are arranged in a swept back pattern, according to one or more embodiments.

In one or more embodiments, the blade pairs may be arranged in a swept back direction. That is, for example, the embodiments shown in FIGS. 15 and 17 may include a blade extending substantially radially outward from the hub with a curved leading edge and a relatively flat trailing edge. The general centerline of the blades in these figures may be substantially aligned with a radial line extending through the center of the hub. In contrast, as shown in FIG. 22, a mixing element 616 may include a blade pattern where the centerline 240 of the blades 220 is tilted rearward from an axial line 242 extending through the center of the hub 218 and through the general center point of the attachment of the blade 220. Still further, in other embodiments, both the leading edge and the trailing edge may be curved to create swept back pattern where the majority of the blade area falls behind a radial line 242 extending through the hub 218 and through the general center point of the blade attachment.

Figure 18:
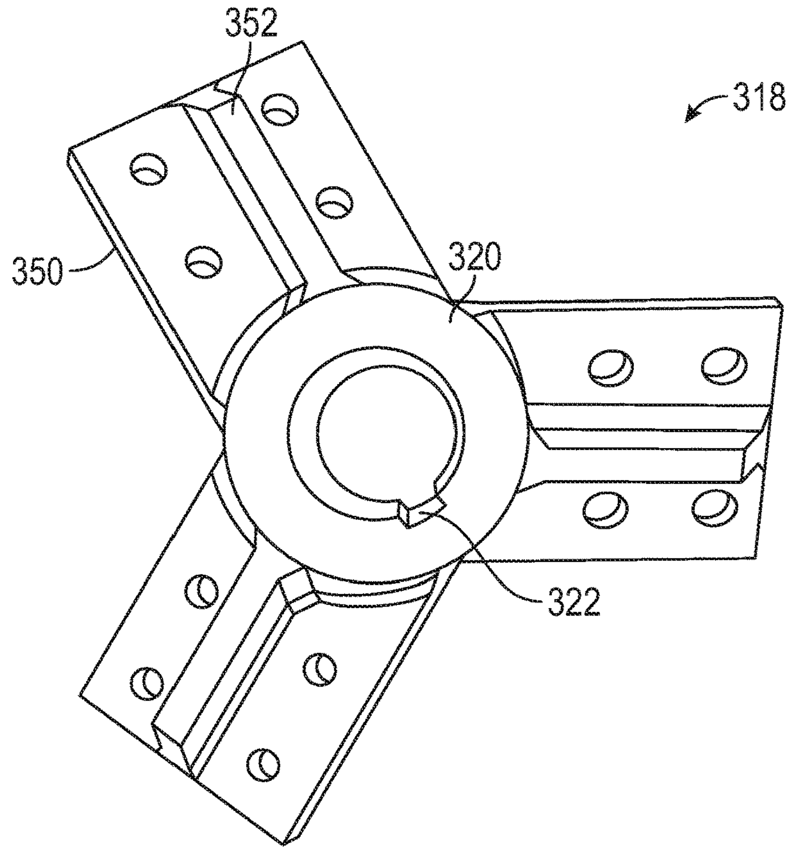
FIG. 18 is a top view of a hub of a gas dispersion impeller, according to one or more embodiments.
Figure 19:
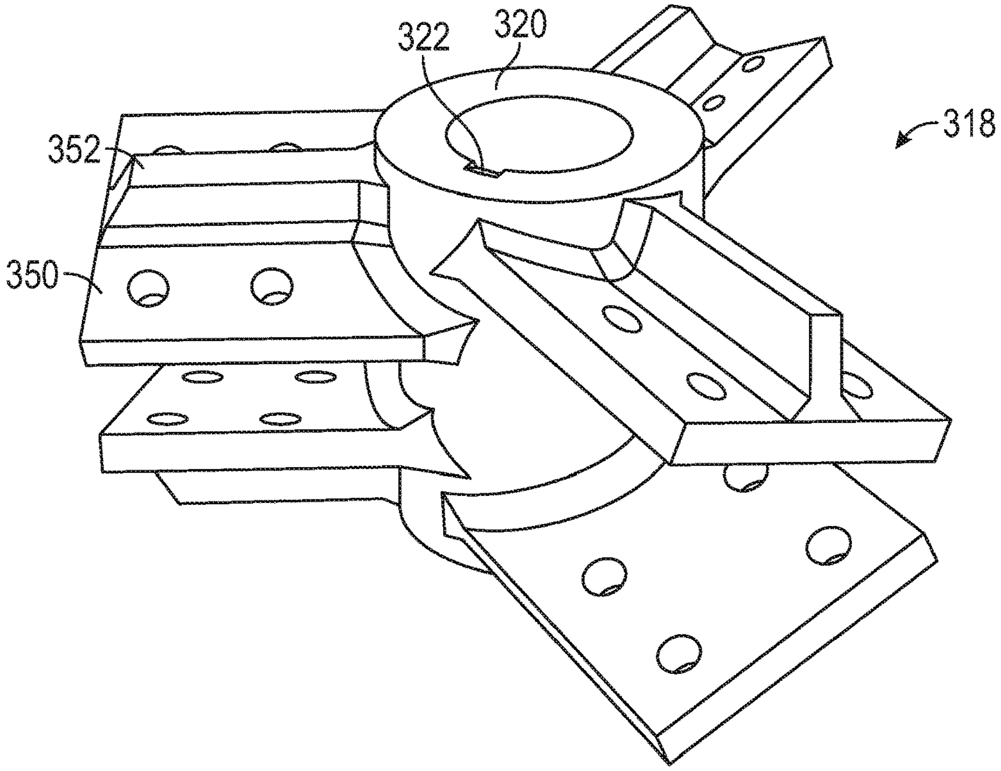
FIG. 19 is a perspective view thereof.
Figure 20:
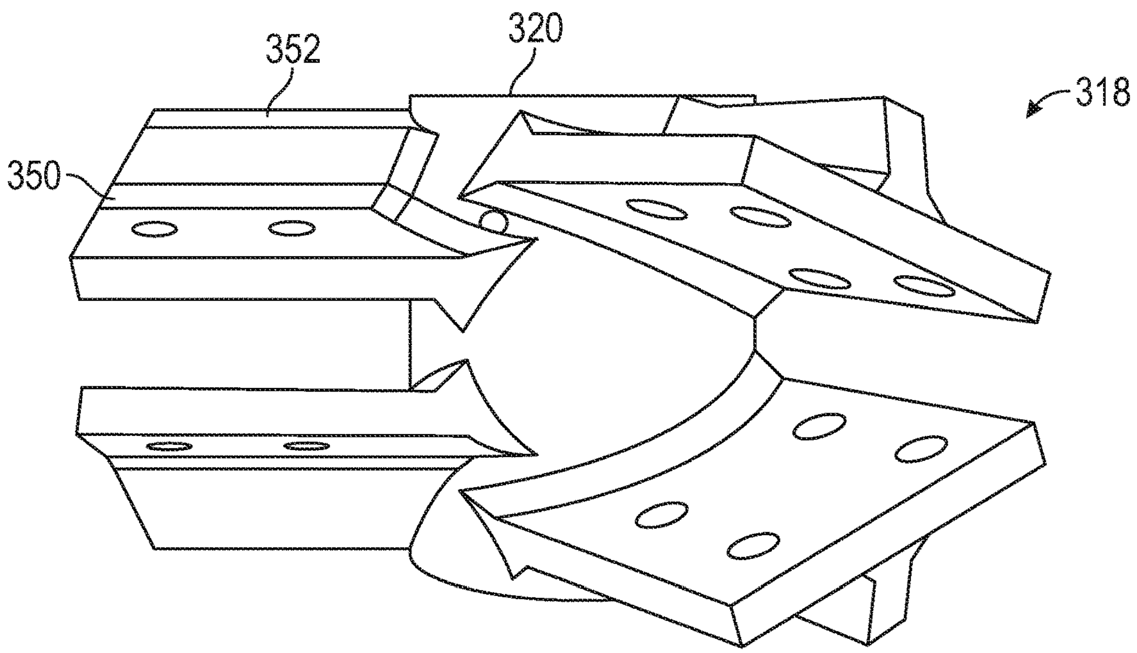
FIG. 20 is a side view thereof.

Referring now to FIGS. 18-20, a blade huh 318 is shown. In one or more embodiments, the blade hub 318 may include a collar 320 for engaging the drive shaft 114. As shown, the collar 320 may be substantially cylindrically shaped with an inner bore and a substantially cylindrical outer surface. The inner bore may include a keyway 322 for receiving a key on the drive shaft 114 to prevent relative rotation between the drive shaft 114 and the hub 318. The hub 318 may include a plurality of blade stubs 350 extending radially outward from the collar 320 and having a defined pitch. The blade stubs 350 may extend radially from the collar 320 for a distance ranging from approximately $1/10^{th}$ of the blade radial length to approximately $1/3^{rd}$ or $1/5^{th}$ of the blade radial length. The blade stubs 350 may include fastener openings for bolting, riveting, or otherwise securing the blades to the stubs 350. The stubs 350 may also include a stiffening rib 352 extending radially along the stub 350 on an outboard side of the stub 350. The blades 220 may be placed on an inboard side of the stubs 350 and may be secured to the stubs 350 with bolts, screws, other fasteners, welding, or other connection techniques. The blades 220 may alternatively be placed on the outside of the stubs 350 and the ribs 352 may be placed on the inside or the blades 220 may be placed on the same side of the stub as the rib 352 and the blade 220 may include a slot to accommodate the rib 352. As shown, an upper stub 350 and a lower stub 350 may be provided at each blade pair 222 location for securing the blades 220 and providing for the upper and lower blade arrangement. The stubs 350 may be pitched as described above to provide the blade pitch relative to the hub 318 or collar 320 thereof. In other embodiments, the stubs 350 may be more horizontally arranged and the blade 220 may include a transition portion to create the blade pitch. For example, the portion of the blade 220 secured to the stub 350 may have an approximately zero blade pitch due to the horizontally arranged stub and the blade 220 may have a transition portion where it transitions from a zero blade pitch to a selected blade pitch. In these embodiments, the upper and lower blades 220 may be secured to upper and lower surfaces of a single stub 350. Where two stubs 350 are provided as shown, the stubs 350 may be spaced from one another taking into account the blade pitch, the blade size, and the position of the blade 220 on the stub 350. As such, the amount of space between the leading and trailing edges 230, 228 of the opposingly pitched blades 220 may be selected or controlled. While a single hub with upper and lower stubs 350 has been shown, separate hubs may be provided. In one or more embodiments, an upper hub and a lower hub may be provided and the hubs may be substantially the same, but the lower hub may be arranged upside down as compared to the upper hub. Where different blade pitches are desired for the upper and lower hubs, the lower hub may not be the same as the upper hub. It may have different stub pitches and may be arranged upside down relative to the upper hub.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A gas dispersion system, comprising:

a drive mechanism;

a drive shaft having a proximal end operably coupled to the drive mechanism, extending to a distal end, and configured to transfer rotational motion and torque;

a mixing element arranged at or near the distal end of the drive shaft, comprising:

a hub; and a plurality of blade pairs, each blade pair including an upper blade and a lower blade secured to the hub and extending generally radially away from the hub, the upper blade and the lower blade each being tapered so as to have a first width at an outer edge and a second narrower width at an inner edge, wherein the upper blade and the lower blade each have a trailing edge and the trailing edges of respective upper and lower blades are separated by a gap configured to allow fluid to flow therethrough.

2. The gas dispersion system of claim 1, wherein the upper blade and the lower blade of the plurality of blade pairs extend along substantially parallel radial lines.

3. The gas dispersion system of claim 2, wherein the upper blade and the lower blade of each of the plurality of blade pairs are arranged at a substantially same circumferential position on the hub.

4. The gas dispersion system of claim 3, wherein each blade of the plurality of blade pairs has a leading edge and a first distance between the leading edges of the blades of a pair of blades is greater than a second distance between the trailing edges of the blades of a pair of blades.

5. The gas dispersion system of claim 4, wherein each blade of the plurality of blade pairs has a stiffness selected to avoid deflective contact during dispersing operations.

6. The gas dispersion system of claim 4, wherein each blade of the plurality of blade pairs has a decreased angle of attack at the leading edge as compared to the trailing edge.

7. The gas dispersion system of claim 2, wherein each blade of the plurality of blade pairs includes a blade pitch.

8. The gas dispersion system of claim 7, wherein the blade pitch is established by a blade stub arranged on the hub.

9. The gas dispersion system of claim 8, wherein the blade pitch of the upper blade and the blade pitch of the lower blade is equal and opposite.

10. The gas dispersion system of claim 9, wherein the blade pitch ranges from −45 degrees to +45 degrees.

11. The gas dispersion system of claim 10, wherein the blade pitch ranges from −30 degrees to +30 degrees.

12. The gas dispersion system of claim 1, wherein the upper blade and the lower blade comprise mirror images of each other.

13. The gas dispersion system of claim 12, wherein a leading edge of the upper blade and the lower blade is arcuate.

14. The gas dispersion system of claim 13, wherein an outer edge of the upper blade and the lower blade is arcuate.

15. The gas dispersion system of claim 1, wherein the upper blade and the lower blade extend substantially radially away from the hub.

16. The gas dispersion system of claim 1, wherein the upper blade and the lower blade extend radially away from the hub in swept back fashion.

17. The gas dispersion system of claim 1, further comprising a tank configured for arrangement of the mixing element therein.

18. The gas dispersion system of claim 17, further comprising a gas supply for introducing gas into the tank.

19. A mixing element for gas dispersion operations, the mixing element comprising:

a hub; and a plurality of blade pairs, each blade pair including an upper blade and a lower blade secured to the hub and extending generally radially away from the hub, the upper blade and the lower blade each being tapered so as to have a first width at an outer edge and a second narrower width at an inner edge, wherein the upper blade and the lower blade each have a trailing edge and the trailing edges of respective upper and lower blades are separated by a gap configured to allow fluid to flow therethrough.

20. The mixing element of claim 19, wherein a leading edge of the upper blade and the lower blade is arcuate.

* * * * *